June 11, 1957  L. W. BAGBY  2,795,778
TOW TARGET

Filed May 3, 1955  2 Sheets-Sheet 1

INVENTOR:
Leland W. Bagby
By Hubert E. Woodcalf
His Patent Attorneys

June 11, 1957
L. W. BAGBY
2,795,778
TOW TARGET
Filed May 3, 1955
2 Sheets-Sheet 2
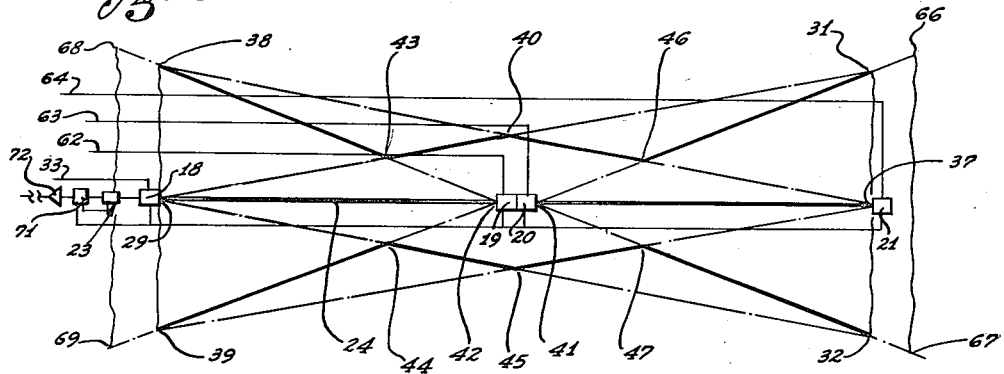
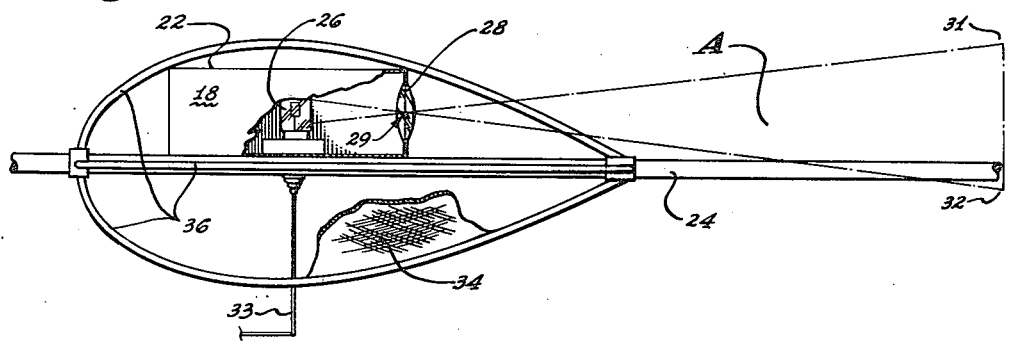
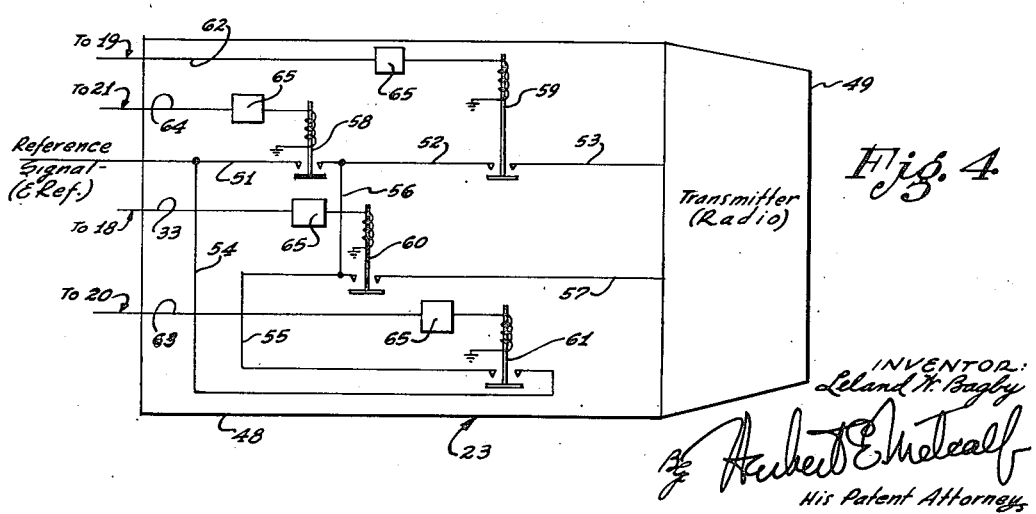
INVENTOR:
Leland W. Bagby
By Hubert E. Metcalf
His Patent Attorneys

2,795,778
TOW TARGET

Leland W. Bagby, Long Beach, Calif., assignor to Northrop Aircraft, Inc., Hawthorne, Calif., a corporation of California Application May 3, 1955, Serial No. 505,775

7 Claims. (Cl. 340—228)

This invention relates to target devices and more particularly to an electronic type aerial target adapted to be streamed from a towing aircraft and functioning to provide information regarding hits scored thereon.

The practice of streaming targets from moving aircraft, thereby facilitating aerial gunning operations, has become quite commonplace procedure. However targets of the type currently utilized for this purpose impose undue limitations on the performance characteristics of a towing aircraft and fail to provide satisfactory information as to hits scored thereon.

The inherent characteristics of banner and other well known types of aerial targets impose high aerodynamic drag on the aircraft from which they are towed and thereby seriously restrict the maximum velocity, altitude, and flight time of the towing aircraft. Also currently available targets do not provide adequate information regarding hits that are scored thereon. For example, they do not provide an immediate indication or record of the hits scored thereon per pass by a firing aircraft, they do not indicate or record the pass on which such hits are scored, and, in cases where two or more aircraft are making passes at the same target, they do not reveal the identity of the aircraft scoring hits.

The above objectional features of conventional type targets are to a great extent overcome by the electronic type target disclosed herein. Briefly the instant target embodies electronic equipment providing a sensing field similar in outline to that of a high speed aircraft. This is accomplished by providing a plurality of sensing units having individual and overlapping sensing fields. The sensors are responsive to projectiles having predetermined characteristics in that they cause an electrical impulse to be generated at such times as they pass through an individual or overlapping sensing field. These impulses are screened and those originating in the overlapping sensing fields are relayed to a transmitting instrument which in turn transmits a signal to established receiving stations. A clearer understanding of the construction and functioning of the instant electronic type target will be forthcoming from the following description of a preferred embodiment thereof.

The terms "target" or "aerial target" as used throughout the specification and appended claims refer to a target towed from a moving aircraft by means of a flexible cable or the like.

An object of the present invention is to provide an electronic type target on which the aerodynamic drag is small as compared with currently available targets at such times as either type is streamed from a moving aircraft.

Another object is to provide an electronic type target which immediately indicates the number of hits scored thereon per pass of a firing aircraft.

Another object is to provide an electronic type target which indicates the particular pass of a firing aircraft during which hits are scored thereon.

Another object is to provide an electronic type target which indicates the aircraft scoring hits thereon at such times as more than one aircraft are firing at the same target.

The objects as set forth above together with other objects and advantages will manifest themselves more fully as the disclosure progresses.

In the drawings:

Figure 2 is a diagrammatic view of the target of Figure 1 showing the sensing fields thereof.

Figure 3 is a detail view of one of the sensing units of the target of Figure 1.

Figure 4 is a wiring diagram in part of the transmitting unit of the target shown in Figure 1.

Figure 1:
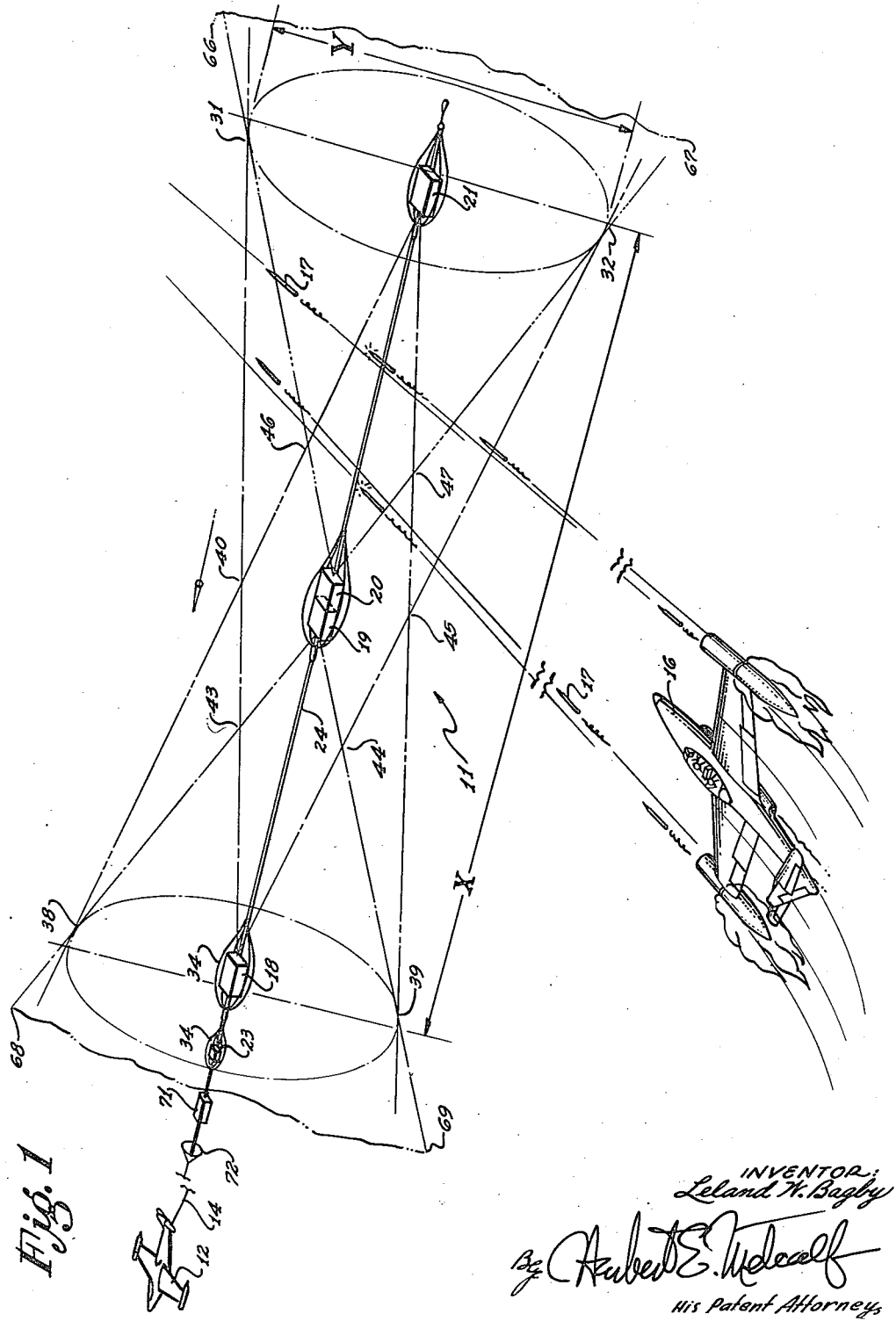
Figure 1 is a view of airplane towing an electronic type target of the type disclosed herein.

Referring now to the drawings for a description of a preferred embodiment of the present invention, Figure 1 shows an electronic type aerial target assembly 11 streamed from a towing airplane 12 by means of a flexible cable 14 and interceptor airplane 16 having a radar fire control system discharging rockets 17 during a firing pass on the target 11. Each of the airplanes shown are of the jet type having high performance characteristics.

The target 11 consists of four (4) sensing units 18 through 21, inclusive, mounted on a rigid rod 24 in fixed relationship. Each of the sensing units are substantially identical and therefore only the unit 18 will be described. This unit includes a sensing element, such as a photoelectric cell 26 or the like, enclosed in a dust proof case 22 as best seen in Figure 3. The unit is provided with a lens assembly 28 which limits the cell's line of sight to a conical shaped sensing field indicated by the lines 29–31; 31–32; and 32–29.

In the absence of a radiant energy source passing through the sensing field as defined above the output of the cell 26 will be unmodulated, however, if a radiant energy source passes through the sensing field the energy therefrom will be sensed by the cell 26 and its output signal modulated. The output signal generated by the cell 26 is fed by means of an electrical connector 33 to a transmitting instrument as presently explained.

If a photo-electric cell 26 is utilized the aforementioned radiant energy source will necessarily be a light source such as a flash head located on each of the rockets 17. The photo-electric cell 26, however, is for purposes of illustration only and it will be obvious, for example, that a gamma ray or other type sensor may be substituted in its place. In the case of a gamma ray sensor the rockets 17 will be tipped with a radioactive substance such as cobalt 60 or the like.

The sensing units 18 and 21 and a transmitting instrument 23 are each enclosed in an individual streamlined structure 34 having longitudinally extending ribs 36 (Figure 3). The units 19 and 20 are enclosed in a similar streamlined structure in back-to-back relationship. Apertures (not shown) are provided in each of the streamlined structures to allow radiation rays to reach the cells 26. The structures 34 minimize aerodynamic drag acting on the sensing units and transmitting instrument while the ribs 36 provide runners for protecting the instruments at such times as the target 11 is being towed on the ground during take-off and landing operations.

The sensing units are fixedly secured to the rod 24 and positioned thereon so that the sensing fields of the units 18 and 20 extend to the right and the sensing fields of the units 19 and 21 extend to the left, as viewed in Figures 1 and 2. The sensing units are further located with respect to each other so that the axes of their sensing fields coincide with a common straight line "A" extending parallel to the rod 24 as shown in Figure 3. The units 18 and 21 are secured to the rod 24 adjacent the ends thereof while the units 19 and 20 are secured to the rod at a position midway between the units 18 and 21. The instrument 23 is also fixedly secured to the rod 24 at a position between the unit 18 and the end of the rod attached to the cable 14.

In the assembled position of the sensor units on the rod 24 the longitudinal distance between the units 18 and 21, indicated by the letter "X" in Figure 1, is approximately thirty (30) feet. In a lateral direction the sensing fields of the various sensing units are limited by the lens assemblies 28 to approximately six (6) feet at their greatest extent as indicated by the letter "Y" in Figure 1. With the units 18 to 21 arranged as described above it will be obvious that certain of the sensing fields overlap each other to define a sensing field hereinafter referred to as the major overlapping sensing field as indicated in Figures 1 and 2 as follows: 38, 39, 44, 45, 47, 32, 31, 46, 40, 43, and 38. This sensing field when projected laterally generally is of the same size as the area of a banner type target.

Referring now to Figure 4 it will be seen that the instrument 23 consists of a signal discriminator section 48 and with a conventional radio transmitter 49. A reference signal E$_{ref.}$ is fed into the transmitter 49 through an electrical circuit including connectors 51, 52 and 53; 51, 56, 55 and 57; or 51, 54, 55 and 57 at such times as various combinations of the relays 58 to 61, inclusive, are closed. Electrical impulses originating in the cells 26 of the respective units 18, 19, 20 and 21 are fed into the section 48 of the instrument 23 by means of electrical connectors 33, 62, 63 and 64 respectively. Impulses originating in the cells 26 are screened by detector elements 65 positioned in each of the connectors 33, 62, 63, and 64.

The detector elements 65 generally allow only those electrical impulses to pass therethrough having a predetermined magnitude and a predetermined rate of change. In other words the detectors will not pass electrical signals originating due to a constant light source in the sensing fields of the cells 26 nor will they pass a signal originating at any great distance outside the aforementioned major overlapping sensing field. Some impulses, however, originated due to projectiles passing through fringe areas bounded by lines identified as follows: 31, 32, 67, 66, and 31 and 38, 39, 69, 68, and 38, as shown in Figures 1 and 2, will be passed by the detectors 65 and relays 58, 59, 60, and 61. These areas, however, can be satisfactorily restricted by the detectors 65 so that they will be small as compared with the aforementioned major overlapping sensing field and will not materially increase the effective area of the target 11.

Referring again to Figure 4 it will be apparent that the reference signal E$_{ref.}$ will reach the transmitter only when at least two or more of the relays 58 to 61, inclusive, are closed. In other words an impulse originating in one of the cells 26, due to a rocket passing through areas defined by the lines 38—40—43—38, etc. will close only one of the relays and the signal E$_{ref.}$ will not reach the transmitter section 49.

A rocket passing through any portion of the major overlapping sensing field will be sensed by one of the three following combinations of sensing units (19–21), (18–20), or (18–21) although the rocket may also be sensed by other sensing units. For example, a rocket passing through the area indicated as follows, 29—43—42—44—29, will be sensed by the units 18, 19, and 21 which contains the combination (18–21). Thus the relays 58 and 60 will be closed permitting the rference signal E$_{ref.}$ to reach the transmitter section via the connectors 51, 56, 55, and 57. Other impulses, originating due to rockets passing through the major overlapping sensing field will similarly allow the reference signal E$_{ref.}$ to reach the transmitter section 49.

The target assembly 11 also includes a wind actuated generator 71 and a radar reflector 72. The generator 71 is secured to the rod 24 immediately forward of the transmitter assembly 23 and supplies electric power to the assembly 23 and the sensing units 18 to 21, inclusive, in a conventional manner. It is to be understood that suitable batteries may be substituted for the generator 71 if desired. The reflector 72 is attached to the cable 14 immediately ahead of the generator 71 and functions to reflect radar beams originating in the plane 16 in a conventional manner and allows the latter plane to lock on the target assembly 11 during a firing pass.

Radio signals transmitted by the transmitter section 49 may be received by radio equipment in the plane 16, thus the pilot will know immediately the number of hits he has scored on each pass on the target assembly 11. Signals from the transmitter section 49 may also be received by radio equipment in the tow-plane 12 or by any ground station within a predetermined range. Accordingly it is seen that an electronic type target is provided which will accomplish the various objects as set forth herein.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an electronic type target, the combination comprising: a plurality of sensing units each having a sensing field and each functioning to generate a unitary electric impulse at such times as a signal generating object passes through a respective one of said sensing fields; said units being arranged with respect to each other so that the respective sensing fields thereof overlap each other to define a major overlapping sensing field; a transmitting device; and electrical means connecting said sensing units and transmitting device whereby the latter functions to transmit an electric signal only at such times as a signal generating object passes through said major overlapping sensing field.

2. Apparatus as set forth in claim 1: further characterized in that said electrical means includes a plurality of relays and an electrical circuit the latter functioning to supply a reference signal to said transmitting device at such times as any combination of said relays are simultaneously closed in response to a signal generating object passing through said major overlapping field.

3. Apparatus as set forth in claim 1: further characterized in that said respective sensing fields are of conical configuration and the sensing units are positioned with respect to each other so that the axes of said respective sensing fields coincide with a common straight line.

4. Apparatus as set forth in claim 3: further characterized in that said plurality of sensing units constitutes a first, second, third, and fourth sensing unit; said first and fourth sensing units being spaced with respect to each other and said second and third sensing units being positioned adjacent each other at a position between said first and fourth sensing units; and the arrangement of said sensing units being further characterized in that said sensing units are positioned so that said major overlapping sensing field is located between said first and fourth sensing units.

5. An electronic type target adapted to be streamed from a towing aircraft, comprising: a plurality of sensing units each having a sensing field and each functioning to generate a unitary electrical impulse at such times as a signal generating object passes through a respective one of said sensing fields; said units being fixedly arranged with respect to each other so that the respective sensing fields thereof overlap each other to define a major overlapping sensing field; a transmitting device, an electric power source connected to supply current to said transmitting device and sensing units; and electrical means including a plurality of relays connecting said sensing units and transmitting device whereby the latter functions to transmit an electrical signal only at such times as a signal generating object passes through said major overlapping sensing field.

6. Apparatus as set forth in claim 5: further characterized by including an electrical circuit adapted to supply a reference signal to said transmitting device at such times as any combination of said relays are simultaneously closed in response to a signal generating object passing through said major overlapping field.

7. Apparatus as set forth in claim 6: further characterized in that said respective sensing fields are of conical configuration and the sensing units are positioned with respect to each other so that the axes of said sensing fields coincide with a common straight line.

References Cited in the file of this patent

UNITED STATES PATENTS

| | | |
|---|---|---|
| 2,401,929 | Hammond | June 11, 1946 |
| 2,448,587 | Green | Sept. 7, 1948 |
| 2,628,836 | Gangel | Feb. 17, 1953 |